US 8,463,831 B2

(12) United States Patent
Harris et al.

(10) Patent No.: US 8,463,831 B2
(45) Date of Patent: Jun. 11, 2013

(54) USER ASSOCIATION OF A COMPUTING APPLICATION WITH A CONTACT IN A CONTACT LIST

(75) Inventors: Mark T. Harris, Westerville, OH (US); Hans D. Dreyer, Pataskala, OH (US); Donald Kenneth Hobday, Jr., Blacklick, OH (US)

(73) Assignee: Checkfree Corporation, Norcross, GA (US)

( * ) Notice: Subject to any disclaimer, the term of this patent is extended or adjusted under 35 U.S.C. 154(b) by 804 days.

(21) Appl. No.: 12/164,856

(22) Filed: Jun. 30, 2008

(65) Prior Publication Data

US 2008/0263069 A1    Oct. 23, 2008

Related U.S. Application Data

(63) Continuation of application No. 10/748,678, filed on Dec. 31, 2003, now Pat. No. 7,395,319.

(51) Int. Cl.
*G06F 17/30* (2006.01)
*G06Q 40/00* (2006.01)
*G06F 12/00* (2006.01)
*G06F 15/16* (2006.01)

(52) U.S. Cl.
USPC ........... 707/899; 707/944; 707/950; 707/951; 705/40

(58) Field of Classification Search
USPC ....... 707/705, 899, 944, 950–951; 705/39–40
See application file for complete search history.

(56) References Cited

U.S. PATENT DOCUMENTS

| 4,864,497 A | 9/1989 | Lowry |
| 5,566,330 A | 10/1996 | Sheffield |
| 5,701,423 A | 12/1997 | Crozier |
| 5,835,089 A * | 11/1998 | Skarbo et al. ................. 715/751 |
| 5,897,635 A * | 4/1999 | Torres et al. ........................... 1/1 |
| 6,049,796 A | 4/2000 | Siitonen |
| 6,253,203 B1 | 6/2001 | O'Flaherty |

(Continued)

FOREIGN PATENT DOCUMENTS

| EP | 1349034 A2 | 10/2003 |
| EP | 1361494 A2 | 11/2003 |

OTHER PUBLICATIONS

Disclosure Statement Under 37 C.F.R. § 1.56 for U.S. Appl. No. 12/164,856.

(Continued)

*Primary Examiner* — Jeffrey A Burke
(74) *Attorney, Agent, or Firm* — Sutherland Asbill & Brennan LLP

(57) ABSTRACT

Methods and systems may be provided for user association of a computing application with a contact in a contact list. A view of one or more contacts of the user may be transmitted to a user, the view including a first contact. A request may be received from the user to associate an application with the first contact. A revised view may be transmitted to the user responsive to the received request, the revised view including a user-selectable mechanism for invoking the application on the first contact. The user may be redirected to a user interface of the application subsequent to the user selecting the user-selectable mechanism associated with the contact in the revised view, and the redirection may include transmission of information associated with the user and information associated with the first contact.

38 Claims, 11 Drawing Sheets

U.S. PATENT DOCUMENTS

| | | | | |
|---|---|---|---|---|
| 6,873,974 | B1* | 3/2005 | Schutzer | 705/41 |
| 7,184,989 | B2* | 2/2007 | Hansen et al. | 705/74 |
| 7,360,164 | B2* | 4/2008 | Bjoernsen et al. | 715/751 |
| 7,376,587 | B1* | 5/2008 | Neofytides et al. | 705/26 |
| 7,536,710 | B2* | 5/2009 | Dunn | 726/2 |
| 7,797,293 | B2* | 9/2010 | Pabla et al. | 707/705 |
| 7,953,759 | B2* | 5/2011 | Grossman et al. | 707/802 |
| 8,112,354 | B2* | 2/2012 | Lalwani et al. | 705/40 |
| 2001/0011248 | A1* | 8/2001 | Himmel et al. | 705/39 |
| 2002/0035556 | A1 | 3/2002 | Shah | |
| 2002/0040352 | A1* | 4/2002 | McCormick | 705/80 |
| 2002/0165932 | A1* | 11/2002 | Rensin et al. | 709/217 |
| 2002/0169748 | A1* | 11/2002 | Macholda | 707/1 |
| 2002/0196922 | A1 | 12/2002 | Marwell et al. | |
| 2003/0084050 | A1 | 5/2003 | Hall | |
| 2003/0131073 | A1 | 7/2003 | Lucovsky et al. | |
| 2003/0174814 | A1 | 9/2003 | Diacakis | |
| 2003/0225688 | A1* | 12/2003 | Dobbins | 705/39 |
| 2003/0236769 | A1 | 12/2003 | Pyhalammi | |
| 2004/0054632 | A1* | 3/2004 | Remy | 705/64 |
| 2004/0078191 | A1 | 4/2004 | Tian et al. | |
| 2004/0083167 | A1* | 4/2004 | Kight et al. | 705/40 |
| 2004/0128322 | A1 | 7/2004 | Nagy | |
| 2004/0143491 | A1 | 7/2004 | Steinberg | |
| 2004/0148252 | A1* | 7/2004 | Fleishman | 705/39 |
| 2004/0151300 | A1 | 8/2004 | Marwell et al. | |
| 2004/0230636 | A1 | 11/2004 | Masuoka et al. | |
| 2004/0243680 | A1* | 12/2004 | Mayer | 709/206 |
| 2005/0060204 | A1* | 3/2005 | Prange | 705/4 |
| 2005/0075925 | A1* | 4/2005 | Sash | 705/14 |
| 2005/0086309 | A1* | 4/2005 | Galli et al. | 709/206 |
| 2005/0091272 | A1* | 4/2005 | Smith et al. | 707/104.1 |
| 2005/0144121 | A1 | 6/2005 | Mayo | |

OTHER PUBLICATIONS ifollow Network Address Book. <www.followap.com/images/downloads_files/iFollow_NAB_Brochure_Apr03.pdf>.

European Search Report for co-pending International Application No. 04027298.1-2212 mailed Nov. 14, 2005.

European Search Report for co-pending International Application No. 04027298.1-2212 mailed Mar. 27, 2006.

Response to European Search Report for co-pending International Application No. 04027298.1-2212 mailed Jun. 13, 2006.

European Search Report for co-pending International Application No. 04027298.1-2212 mailed Jan. 5, 2007.

Non-Final Office Action for related U.S. Appl. No. 10/748,678 mailed Nov. 23, 2007.

Notice of Allowance for related U.S. Appl. No. 10/748,678 mailed Mar. 20, 2008.

* cited by examiner

| | | | |
|---|---|---|---|
| \multicolumn{2}{General} | \multicolumn{2}{Application-Specific (EBP)} |
| Public | Private | Private | Hidden |
| | Name<br>• Last name<br>• First name<br>• Title<br>• Company | Alternate name<br>• Alt last name<br>• Alt first name<br>• Alt title<br>• Alt company | Scrubbed name<br>• Scrubbed last name<br>• Scrubbed first name<br>• Scrubbed title<br>• Scrubbed company |
| | Address<br>• Street<br>• City<br>• State<br>• Zip<br>• Country | Alternate address<br>• Alt street<br>• Alt city<br>• Alt state<br>• Alt zip<br>• Alt country | Scrubbed address<br>• Scrubbed street<br>• Scrubbed city<br>• Scrubbed state<br>• Scrubbed zip<br>• Scrubbed country |
| | Phone #s<br>• Work phone #<br>• Home phone #<br>• Fax phone #<br>• Mobile phone #<br>• Other phone # | Alt phone #s<br>• Alt work phone #<br>• Alt home phone #<br>• Alt fax phone #<br>• Alt mobile phone #<br>• Alt other phone # | Scrubbed phone #s<br>• Scrubbed work phone #<br>• Scrubbed home phone #<br>• Scrubbed fax phone #<br>• Scrubbed mobile phone #<br>• Scrubbed other phone # |
| | Email ID | Alt email ID | Scrubbed email ID |
| | Custom field(s) | Application | Entity identifier |
| | Categorization | Account number | Scrubbed account number |
| | | Deposit account #<br>• RTN<br>• DDA | Scrubbed deposit account #<br>• Scrubbed RTN<br>• Scrubbed DDA |
| | | Account ID (e.g., UPIC) | Scrubbed account ID (e.g., UPIC) |
| | | Remote network ID | Scrubbed remote network ID |
| ⋮ | ⋮ | ⋮ | ⋮ |

FIGURE 1

Summary View 800

| Name | Company | Primary Contact | Category | Applications |
|---|---|---|---|---|
| Diebold, Karen | Smallville Optometrists | (222) 222-2222 | Business | |
| Pearson, Thomas | Smallville Mutual Insurance | kdiebold@smallvilleins.com | Business | |
| Santilli, Carlos | | (444) 444-4444 | Friends | |
| | | carlos.santilli@yahoo.com | Friends | |

USER ASSOCIATION OF A COMPUTING APPLICATION WITH A CONTACT IN A CONTACT LIST

RELATED APPLICATION DATA

The present application is a continuation of U.S. patent application Ser. No. 10/748,678, filed Dec. 31, 2003, entitled "Contact List for Accessing a Computer Application" (now U.S. Pat. No. 7,395,319), the contents of which is incorporated by reference herein in its entirety.

FIELD OF THE INVENTION

Embodiments of the invention are related to a contact list, and more particularly to a contact list and method for accessing computing application functionality.

BACKGROUND OF THE INVENTION

Many computing applications, including Web-based applications, have user-specific and application-specific lists of contacts or other entities that are acted upon by that computing application. For example, an e-mail client, such as Microsoft Outlook or Lotus Notes, typically contains a personal address book, and an electronic billing and payment (EBP) client, such as CheckFree's WebBillPay (WBP), contains a payee list. These entity lists are commonly referred to as contact lists. A primary benefit of such contact lists is elimination of repeated user entry of the same data within an application.

Some applications "scrub" user supplied contact list data to ensure that improved information is consistently utilized by the application. Scrubbing can include normalizing and/or correcting user supplied data. For example, an application might correct a name, address, funding account information, or a user's account number with a payee. Often a user is unaware that contact list data has been scrubbed. That is, when accessing a contact list, a user may see the originally supplied contact list data, while the computing application may actually utilize scrubbed data in providing functionality to the user.

The scope of each contact list is restricted to its application context. Thus, there may be redundancy in the data between contact lists associated with various computing applications. For example, an e-mail client address entry might contain a name and an e-mail identifier (address), and possibly address/phone information, while an EBP client payee entry might contain the same name and address information, and possibly e-mail identifier. Beyond the same information being stored in multiple locations, i.e., in association with multiple applications, a user must input and update this same information repeatedly, i.e., into each application. This multiple information entry, as will be recognized, is at best inefficient.

Computing applications presuppose a function-centric application invocation metaphor. In other words, a user first launches or otherwise access a computing application, then selects a function to perform within the accessed computing application, and then finally specifies the data to be operated upon by the accessed computing application, perhaps from an available contact list.

While computing applications are function-centric, in some computing domains there is precedence for a data-centric approach in which data is presented via a user interface first, then a function is selected and applied to an element of the data. A simple example is the list of folders/files in the My Documents folder of the Window's operating system. From the My Documents folder a user can right-click on one of the displayed items in the folder (stored files) to bring up a set of function choices that can be performed on that selected file, such as opening the selected file, or deleting the selected file.

There also are computer-based "rolodex" type lists that exist just on their own, independent of any computing application. For example, personal digital assistants (PDAs) such as Palm devices, can maintain an address book conveniently populated through a PC-based user interface. These contact lists are currently incapable of doing more than integrating with other tools (typically e-mail or calendar clients through synchronization). Thus, these type contact lists cannot be used to drive application functionality.

A "Web service" is a network accessible interface to application functionality built using standard Internet technologies. Web services are also known as "common services." A collection of software and tools that enable developers to create, deploy, and access Web services has been proposed by Microsoft. It is important to understand that even though Microsoft's software suite for enabling Web services, known as the .NET platform, is perhaps the most well known, it is by no means the only way to build or use Web services.

A component of Microsoft's original .NET proposal was to offer to consumers a suite of commonly used Web services, dubbed Microsoft .NET My Services. Two of the proposed services are .NET My Contacts, which stores an electronic relationships/address book for a subscriber at a network location distinct from a subscriber's computer, and .NET Passport, which is a subscriber authentication service.

.NET Passport, which has been introduced by Microsoft into the marketplace, allows participating subscribers to create one sign-in name and password for use across participating .NET Passport sites. Additionally, subscribers can save time and avoid repetitive data entry by storing basic demographic information that can be shared with .NET Passport sites. When a subscriber signs in to a participating .NET Passport site, .NET Passport sends the subscriber's identifying information such as ZIP Code, country/region, and city information to the site upon request, or, alternatively a .NET Passport data repository can be accessed by participants in the Web service. Subscribers can also choose to provide more personal information, such as their nickname, E-mail address, age, gender, and language preference.

.NET My Contacts, as disclosed by Microsoft, will allow subscribers to store "address book" type of information, presumably protected and accessed through Passport, at a central location. Microsoft has not defined a user interface for My Contacts, or proposed use scenarios, including interactions between .NET My Contacts data and applications, particularly in the context of EBP.

As will be understood from the discussion above, data stored in existing contact lists and proposed contact lists cannot be utilized by multiple applications. Also, existing and proposed contact lists cannot trigger application functionality. Further, existing and proposed contact lists are not structured such that flexible access control over various aspects of contact information, including population and/or modification of some data by other than the user, is available.

Accordingly, a need exists for an application-independent contact list in which contact data stored therein can be utilized by multiple applications. Also, a need exists for a contact list user interface that supports the triggering of one or more of multiple applications based upon selection of contact data. And, a need exists for an application-independent contact list that provides flexible access control over various segments of contact information, including the ability to allow population or modification of at least a portion of contact data by one or more entities other than a user.

Introduced above, existing EBP computing applications have a function-centric process flow. That is, to direct an EBP transaction a user must first trigger or otherwise access an EBP application, which may be Web-based. After triggering the EBP computing application, the user must select a function (transaction type) to be executed by the accessed EBP computing application. Then, the user must specify or select data, sometimes from an application-specific contact list, associated with the desired function. The specified or selected data might be a payee name, an electronic biller name, or other data, such as an account identifier or date. Only after the user has performed these steps is the desired function executed by the accessed EBP computing application. Thus, due to the function-centric nature of EBP applications, a user cannot conveniently access EBP functionality. He or she must first access an EBP computing application, select a function to be performed, and then select data to be utilized with the selected function. A data-centric EBP process flow would eliminate steps, allowing instant access to desired functionality.

Accordingly, a need exists for an EBP process flow that is data-centric, rather than function-centric.

BRIEF DESCRIPTION OF THE INVENTION

In accordance with embodiments of the invention, methods and systems for user association of an application with a contact in a contact list are provided. A wide variety of applications may be associated with a contact, including an electronic commerce function. An electronic commerce function can be, but is not limited to, a submission of an electronic payment request, such as, but not limited to, a bill payment, a retail payment, a person-to-person payment, or a business-to-business payment, a request to view billing information electronically (i.e., be electronically billed), and an electronic request to issue a bill or an invoice. An electronic commerce function may be performed via a network. A network can be, but is not limited to, the Internet, a local area network, a wide area network, and the public switched telephone network, as well as any other network capable of transmitting information, including a wireless network. Also, a network can be multiple interconnected networks.

According to various embodiments of the invention, a system may include one or more communications interfaces and one or more processors. Each communications interface is configured to receive and transmit information via at least one network. Information received by the communications interface is passed on to at least one processor. A processor can be any type of device capable of functioning to implement methods described herein, including, but not limited to, a processor as found in a typical personal computer, main-frame computer, server-type computer, or any other type of computing device. In certain aspects and embodiments of the present invention, a system includes one or more memories configured to store information. A memory can include, as desired, any medium and/or device for storing information.

In accordance with one embodiment of the invention, a method may be provided. A view of one or more contacts of a user, including a first contact, may be transmitted or otherwise communicated to a user. A request to associate an application with the first contact may be received from the user. A revised view that includes a user-selectable mechanism for invoking the application on the first contact may be communicated to the user responsive to the received request. The user may be redirected to a user interface of the application subsequent to the user selecting the user-selectable mechanism associated with the first contact in the revised view, and the redirection may include a transmission of information associated with the user and information associated with the first contact.

According to another embodiment of the invention, a system may be provided. The system may include a communications interface and a processor. The communications interface may be operable to transmit, to a user, a view of one or more contacts of the user, including a first contact, and to receive, from the user, a request to associate an application with the first contact. The communications interface may further be operable to transmit, to the user and responsive to the received request, a revised view that includes a user-selectable mechanism for invoking the application on the first contact, wherein the user is redirected to a user interface of the application subsequent to the user selecting the user-selectable mechanism associated with the first contact in the revised view, and wherein the redirection includes transmission of information associated with the user and information associated with the first contact. The processor may be operable to direct the communications interface to transmit the view of the one or more contacts, and to direct the communications interface to transmit the revised view responsive to the received request.

According to another aspect of the invention, a system may be provided. The system may include means for transmitting, to a user, a view of one or more contacts of the user, including a first contact. Additionally, the system may include means for receiving, from the user, a request to associate an application with the first contact and means for transmitting, to the user and responsive to receiving the request, a revised view that includes a user-selectable mechanism for invoking the application on the first contact. The user may be redirected to a user interface of the application subsequent to the user selecting the user-selectable mechanism associated with the first contact in the revised view. The redirection may include transmission of information associated with the user and information associated with the first contact.

It will also be understood by those skilled in the art that the invention is easily implemented using computer software. More particularly, software can be easily programmed, using routine programming skill, based upon the description of the invention set forth herein and stored on a storage medium which is readable by a computer processor to cause the processor to operate such that the computer performs in the manner described above.

Other embodiments, aspects, features, and advantages of the invention will become apparent to those skilled in the art from the following detailed description, the accompanying drawings, and the appended claims.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 1 is a simplified depiction of stored information associated with an extended contact list of the present invention.

FIG. 8 is an exemplary summary view user presentation of the extended contact list in accordance with certain aspects of the present invention.

DETAILED DESCRIPTION OF THE INVENTION

Figure 2:
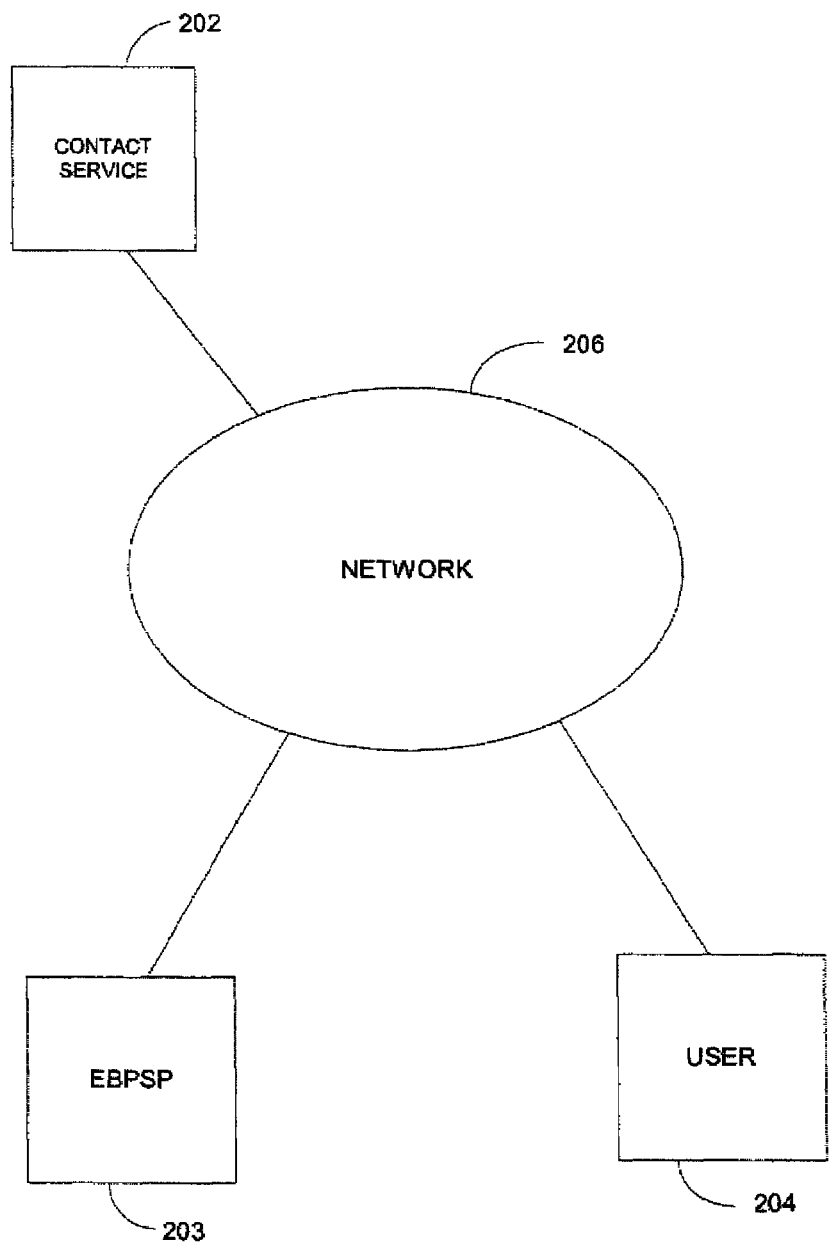
FIG. 2 is an exemplary network diagram depicting the extended contact list of FIG. 1 hosted by a contact service in accordance with certain aspects of the present invention.

An extended contact list for storing information usable by multiple computing applications and from which multiple computing applications may be triggered is provided by the present invention. The extended contact list includes not only information identifying and associated with one or more entities, but also information associated with one or more computing applications. The stored computing application information is linked to the stored entity information. Linked information is presented together via a contact list user interface.

The extended contact list, in one embodiment, is stored by a contact service at a central location on a network, to be discussed further below. The contact service could be .NET My Contacts, discussed above, could be another Web service, or even could be a computing application service provider. Preferably, multiple extended contact lists, each associated with a different user, are stored by the contact service. In another embodiment, an individual user's extended contact list is stored on that user's computer.

FIG. 1 is a simplified depiction of stored information associated with a single entry 100 of the extended contact list of the present invention, no matter where stored. Each entry is segregated into a general portion 105 containing contact information identifying an entity, and zero or more computing application-specific portions containing information for use by a computing application, which could be a Web-based computing application, or a computing application residing on a user's computer. FIG. 1 depicts a single application-specific portion 106. However, any single entry could have two or more application-specific portions, or even no application-specific portions.

General information is any information typically contained in a contact list. General information may be, as desired by a user, subdivided into a public portion 105A and a private portion 105B. Information in the public portion 105A is information the user is willing to make publicly available to all, which includes potentially all network users. Information in the private portion 105B is information the user wishes to protect, i.e., make available to less than (possibly none of) the full public. In the example of FIG. 1, the user has chosen to make all general information in entry 100 private.

As seen in FIG. 1, each entry includes multiple data fields 107A-107N. Some data fields may apply to both the general portion 105 and at least one application-specific portion 106, e.g., data fields 107A-107D. Some data fields may only apply to an application-specific portion 106, e.g., data fields 107E-107N in columns 106A and 106B. Some data fields may only apply to the general portion 105, e.g., data fields 107E-107F in column 105B. It is not mandatory that each data field include information, whether supplied by a user or an application. Thus, for any given entry, some data fields may be considered mandatory (i.e., must be filled in), while other fields may be considered optional (i.e., need not contain data). The multiple data fields in the general portion 105 include: the entry's name 107A/105B, including first and last name, title, and company; the entry's address 107B/105B, including street, city, state, ZIP, and country; the entry's phone numbers 107C/105B, including work phone number, home phone number, fax phone number, mobile phone number, and other phone number; the entry's e-mail identifier (address) 107D/105B; one or more user—or application—customizable fields 107E/105B; and a categorization, i.e., business, friend, etc, field 107F/105B. Other fields, whether optional or mandatory, may be included and are within the scope of the present invention.

FIG. 1 shows a single application-specific portion 106 included in entry 100, which in this example is related to an EBP application. An application-specific portion 106 consists of application-specific data and overrides to information in the general portion 105. Data stored in the application-specific portion 106 is utilized by an application in providing functionality to a user to which the contact list belongs. An application-specific portion may be further subdivided. A first subdivision is a private portion 106A, consisting of information the user can enter/modify/see and which he wishes to protect, making it available to less than the full public. The second subdivision is a hidden portion 106B, consisting of information entered by the application with which the application-specific portion 106 is associated, which the user cannot modify/see, and which is as protected as the private portion. This hidden portion 106B consists of scrubbed data and/or data populated into the entry 100 by the application with which the application-specific portion 106 is associated.

As the user creates an application-specific portion 106, he may provide overrides for many of the items in the general portion 105. For example, he may refer to the entity by an alternate name, or provide an alternate address, phone number or e-mail identifier. In addition, the user must specify an application to associate with application-specific portion 106. Associating an entry with an application will be discussed further below. The user may further provide additional application-specific fields. For example, for an associated EBP computing application, the user may provide an account number at the entity, and possibly even provide payment account-related information.

An associated computing application may place scrubbed versions of private portion 106B information in the hidden portion 106B, though this may not always be required. That is, an associated computing application will perform scrubbing when required by that computing application. For example, an EBP application may normalize or correct the entity name, address, or payment account information, or the user's account number. In addition, an associated computing application may insert supplemental information, such as an identifier by which the entity is known to the associated computing application.

FIG. 2 is a network diagram depicting a contact service 202 that maintains the extended contact list in communication with an application service provider, in this example an EBP service provider (EBPSP) 203, and a user 204 via a network 206. Network 206 can be the Internet, or one or more other networks. It should be noted that other types of application service providers could be in communication with the contact service 202, as well as other users. However, for the sake of simplicity, only a single application service provider, EBPSP 203, and only a single user, user 204, are depicted in FIG. 2. It should also be noted that the functionality of the contact service 202 could be split, such that one entity maintains the data and controls access to it, while another entity presents the user interface to the data. However, for the sake of simplicity, the discussion below relates to a single entity performing both of these functions. The contact service 202 stores an extended contact list on behalf of user 204.

In the present example the EBPSP 203 provides an electronic payment application, sometimes referred to as e-payments, and provides an electronic billing application, sometimes referred to as e-billing, utilizing data stored by the contact service 202. The EBPSP 203 can also provide other electronic commerce services. It should be noted that a single application providing both e-payments and e-billing could be provided by the EBPSP 203.

The contact service 202 maintains a computing system for hosting extended contact lists and communicating with EBPSP 203 and user 204. The computing system includes one or more computing platforms, with one computing platform 300 being shown in FIG. 3. When multiple computing platforms are utilized, they are networked together. Each computing platform 300 consists of one or more processors 303 configured to execute programming instructions, which may be, as desired, hardcoded or softcoded, stored in one or more memories 305. Each computing platform 300 also includes one or more communication interfaces 315 for transmitting and receiving data at via network 206. As desired, a communication interface 315 also transmits and/or receives data via one or more other networks not depicted in FIG. 2.

Figure 3:
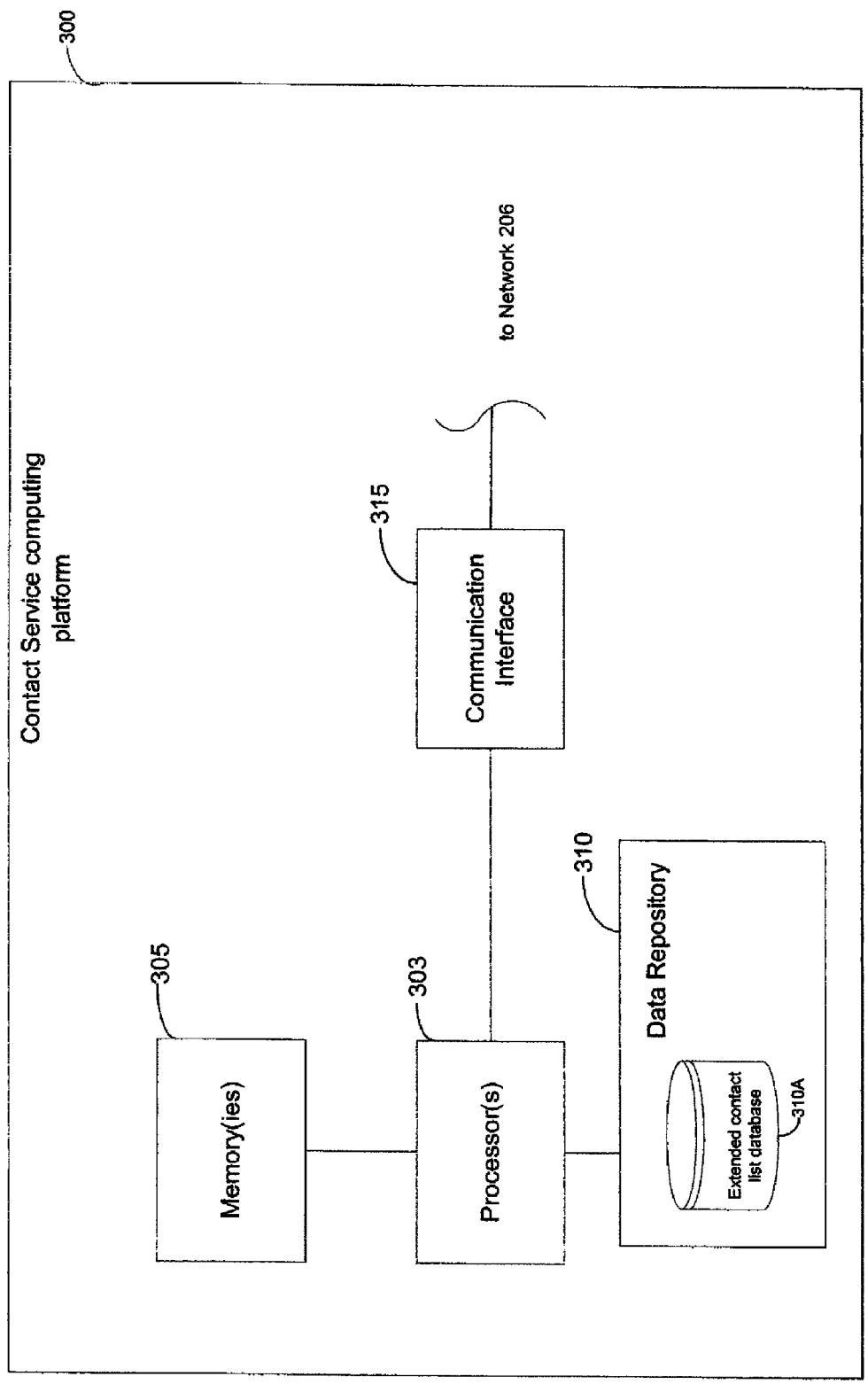
FIG. 3 is a simplified depiction of a computing platform associated with the contact service of FIG. 2 in accordance with certain aspects of the present invention.

The contact service computing system also includes a data repository 310, which may reside on a computing platform 300, or be distributed on dedicated database servers, or elsewhere on a computing network connecting multiple computing platforms. FIG. 3 depicts data repository 310 residing on a computing platform 300. Data repository 310 includes one or more extended contact lists databases 310A for storing users' contact lists. As necessary, a computing platform 300 includes interfaces, including, but not limited to, any of a display, keyboard, mouse, microphone, disk, tape, and printer, not shown in FIG. 3. Such devices are collectively referred to as I/O interfaces.

Figure 4:
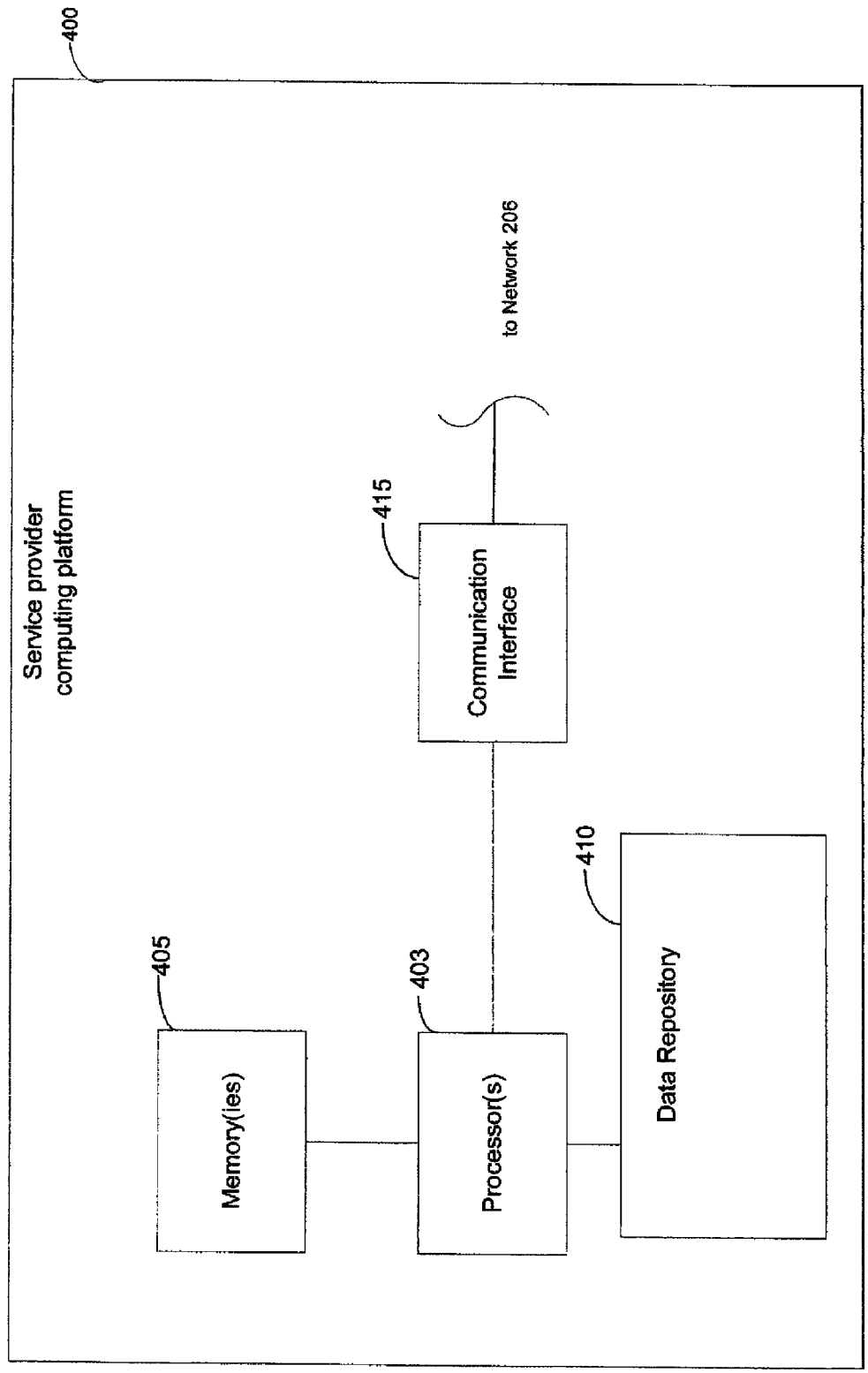
FIG. 4 is a simplified depiction of a computing platform associated with a service provider which utilizes information stored in the extended contact list of FIG. 1 in providing functionality in accordance with certain aspects of the present invention.

The EBPSP 203 is also associated with a computing system. FIG. 4 is a simplified exemplary depiction of a computing platform 400) for use by the EBPSP 203. Like the computing system of the contact service 202, the computing system of the EBPSP 203 includes one or more computing platforms, with one computing platform 400 being shown in FIG. 4. When multiple computing platforms are utilized, they are networked together. Each computing platform 400 consists of one or more processors 403 configured to execute programming instructions which may be hardcoded or softcoded, stored in one or more memories 405. Each computing platform 400 also includes one or more communication interfaces 415 for transmitting and receiving data at via network 206. As desired, a communication interface 415 also transmits and/or receives data via one or more other networks not depicted in FIG. 2.

The EBPSP computing system also includes a data repository 410, which may reside on a computing platform 400, or be distributed on dedicated database servers, or elsewhere on a computing network connecting multiple computing platforms. FIG. 4 depicts data repository 410 residing on a computing platform 300. Data repository 410 stores information associated with providing EBP services to user 204, and preferably other users. As necessary, a computing platform 400 has I/O interfaces, not shown in FIG. 4.

Figure 5:
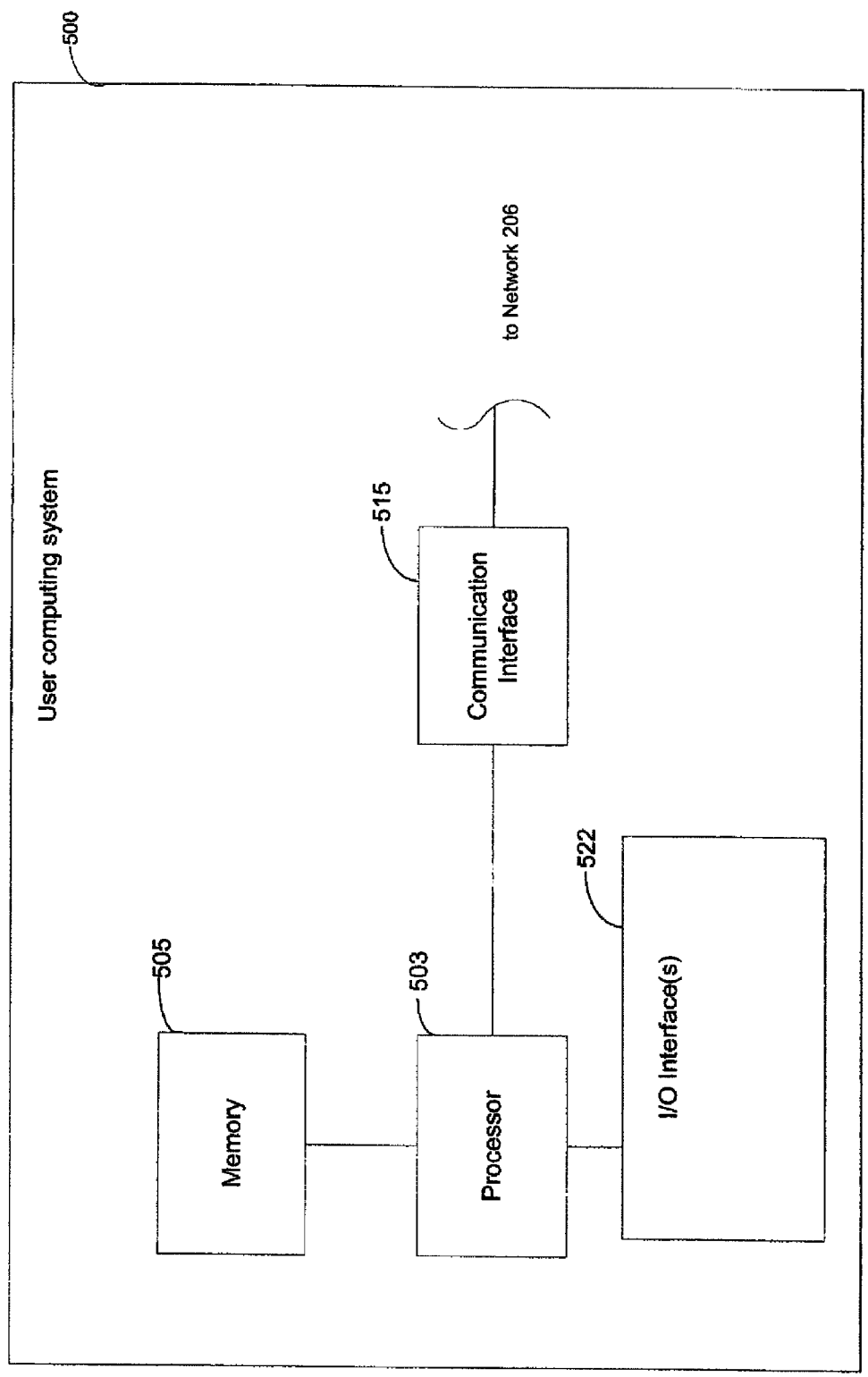
FIG. 5 is a simplified depiction of a computing system associated with a user to whom information stored in the extended contact list of FIG. 1 belongs in accordance with certain aspects of the present invention.

FIG. 5 is a simplified exemplary depiction of a computing system 500 for use by user 204. System 500 includes a processor 503 configured to execute programming instruction stored in a memory 505. System 500 also includes a communication interface 515 for transmitting and/or receiving information via the network 206. Computing system 500, as necessary, also includes I/O interfaces 522, which preferably includes at least a display and keyboard.

In an alternative implementation, an application service provider, such as EBPSP 203, hosts the extended contact list instead of the contact service 202. In such a case, the application service provider hosting the extended contact lists would perform the same functions performed by the contact service 202 described herein. Also, in another alternative implementation, the user's computing system 500 hosts the extended contact list in memory 505.

Preferably, access to the extended contact list is controlled by a user authentication mechanism, such as Microsoft's .NET Passport, when not hosted on the user's computing system 500 In the example included herein, .NET Passport is shown as the authentication mechanism, though it should be understood that any authentication mechanism could be utilized.

Figure 6:
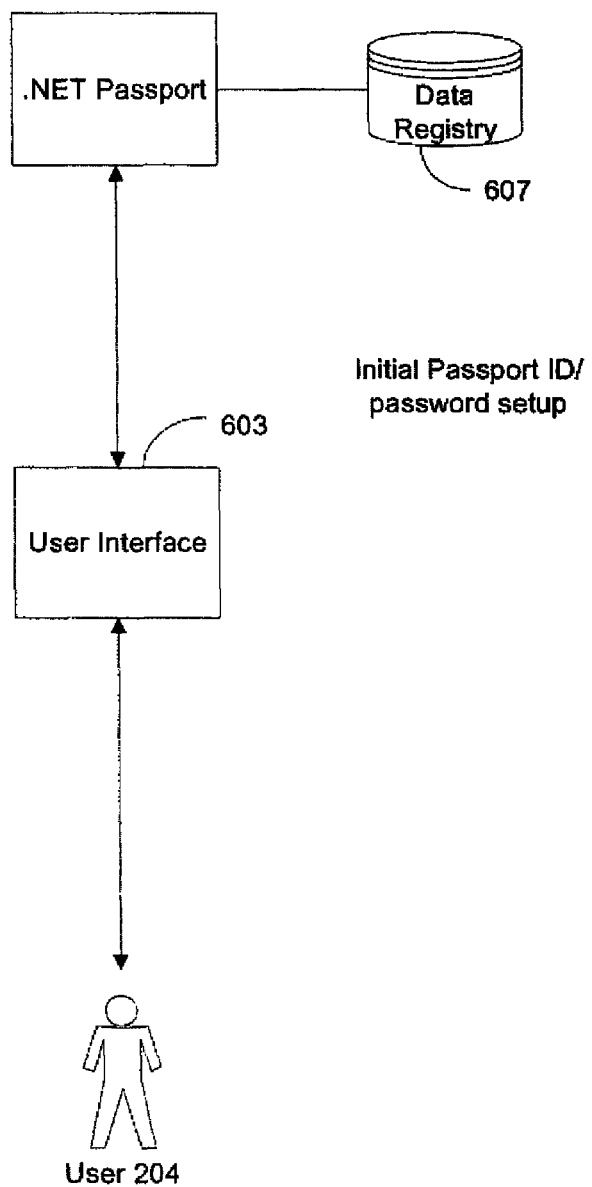
FIG. 6 is a simplified depiction of a user obtaining network credentials in accordance with certain aspects of the present invention.

FIG. 6 depicts user 204 obtaining a .NET Passport utilizing a user interface 603. EBPSP 203, contact service 202, or any entity participating in the .NET Passport framework could present user interface 603. Via user interface 603, user 204 obtains an ID/password combination that is stored in a .NET Passport data registry 607 in association with information identifying and associated with user 204, typically including an e-mail identifier.

Figure 7:
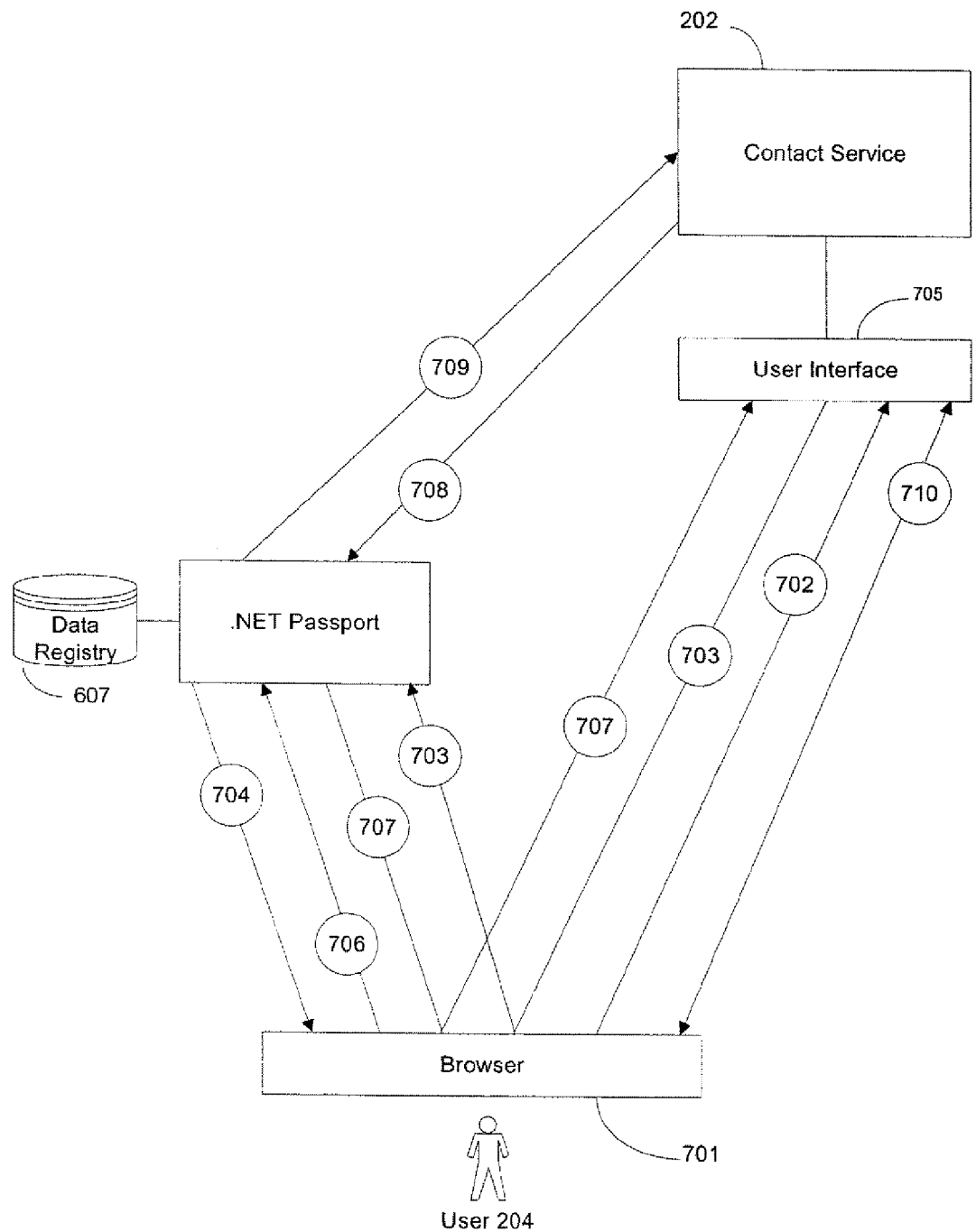
FIG. 7 is a simplified exemplary depiction of a user accessing an extended contacts list stored at a network location utilizing network credentials in accordance with certain aspects of the present invention.

As shown in FIG. 7, detail 702, the first time user 204 directs a Web browser 701 to an extended contact user interface (UI) 705 hosted by the contact service 202 computing system, there are no accompanying authentication credentials from .NET Passport and the extended contact UI 705 detects this. The extended contact UI 705 redirects the user's browser to .NET Passport for authentication, detail 703. A .NET Passport computing system presents a screen to user 204 asking for authentication credentials (at a minimum, password), and whether it is desired to have this "remembered" for future sessions from this browser 701 at the contact service, detail 704.

At detail 706, user 204 responds. For simplicity, it is assumed the user 204 indicates that he or she wants the credentials "remembered" so that they do not have to be provided at each visit to the contact service 202. .NET Passport updates its local repository 607, provides "cookies" to the user's browser 701, and redirects browser 701 back to the contact service UI 705, as shown in detail 707. The redirection includes an encrypted authentication query string that indicates to the contact service 202 that the user 204 has been successfully authenticated. As desired, the contact service 202 requests any available profile information on the user 204 from the .NET Passport database 607, detail 708.

As shown in detail 709, .NET Passport returns any available profile information on the user 204 to the contact service 202. User 204 is now authenticated. The contact service 202 then allows the user 204 full access to the extended contact lists via the user interface 705, detail 710. This could include creating an extended contact list, adding entries to an existing extended contact list, accessing existing entries, and/or modifying existing entries.

FIG. 8 is an exemplary summary view 800 of an extended contact list as presented to user 204 via the contact service UI 705. It should be noted that differently configured contact information presentations could be presented and are within the scope of the present invention. It should also be noted that the exemplary summary view 800 could be presented by another entity hosting the extended contact list, or could be presented by the user system 500 if the extended contact list is hosted by the user system 500.

In the summary view 800 entries are presented in an abbreviated form, only showing a subset of key fields of FIG. 1. The entries are sorted, in this instance by Name 801. Entries can also be sorted by company 805, primary contact information 807, category 810, or even by associated application 812, as desired by user 204. Note that presented information may combine, as desired, individual data elements (e.g., Name 801 is a combination of last name and first name), or presented information may derive, as desired, from different fields depending on user preference settings (e.g., Primary Contact 807 in some cases is a phone number and in some cases is an e-mail identifier). The categorization 810 permits user-specified grouping and filtering.

Associated applications column 812 indicates the application(s) that are associated with individual entries in the extended contact list, and permits accessing of each application from a position on the entry. In the example of FIG. 8, applications are shown as user-selectable icons. Alternatively, a URL or other type of link could be presented. Or, a right mouse-click when positioned on the entry could bring up an entry-customized set of choices.

In this example, the envelope symbol is used to denote an application that can send the entity a message. This could be the same application invariably (e.g., an e-mail client). Or, the application could vary depending on available information (e.g., could trigger a fax or a mailing of a letter). For varying applications, another component could reside between the expanded contact list presentation and the invoked application. This might be, as desired, a plug-in or other similar extension to the extended contacts list.

Alternatively, this could be the first application invoked, which would then invoke an appropriate application based upon the available information. In such cases, the intermediary application component receives an identification of the function/icon and a set of parameters (public/private/hidden) associated with the entry. For the example of the envelope icon, among the parameters provided might be a street address, fax number, and/or e-mail address associated with the entity. The intermediary component directs a traditional postal delivery of a document to the street address, a fax of a document to the fax number, or an e-mail of the document to the e-mail address, based upon which type of information has been provided, the intermediary component preferably implements rules-based precedence ordering, which it could establish itself, or potentially have established as a user preference via a user preference-setting user interface. The $ symbol indicates an EBP application. Here, too, the symbol could indicate the same application invariably, or change according to available information (e.g., could be one type EBP application for business-to-business payments, and another type EBP application for person-to-person payments). Based upon provided parameters (information) an intermediary application determines, in one alternative, if the entity is a business or personal entity, and triggers either a business-to-business or a person-to-person payment. Of course, other types of payments could be triggered, depending upon the provided information and/or other factors. Alternatively, a different application icon (e.g., the empty box) could be used to denote a different type EBP application from that associated with the $ symbol.

Figure 9:
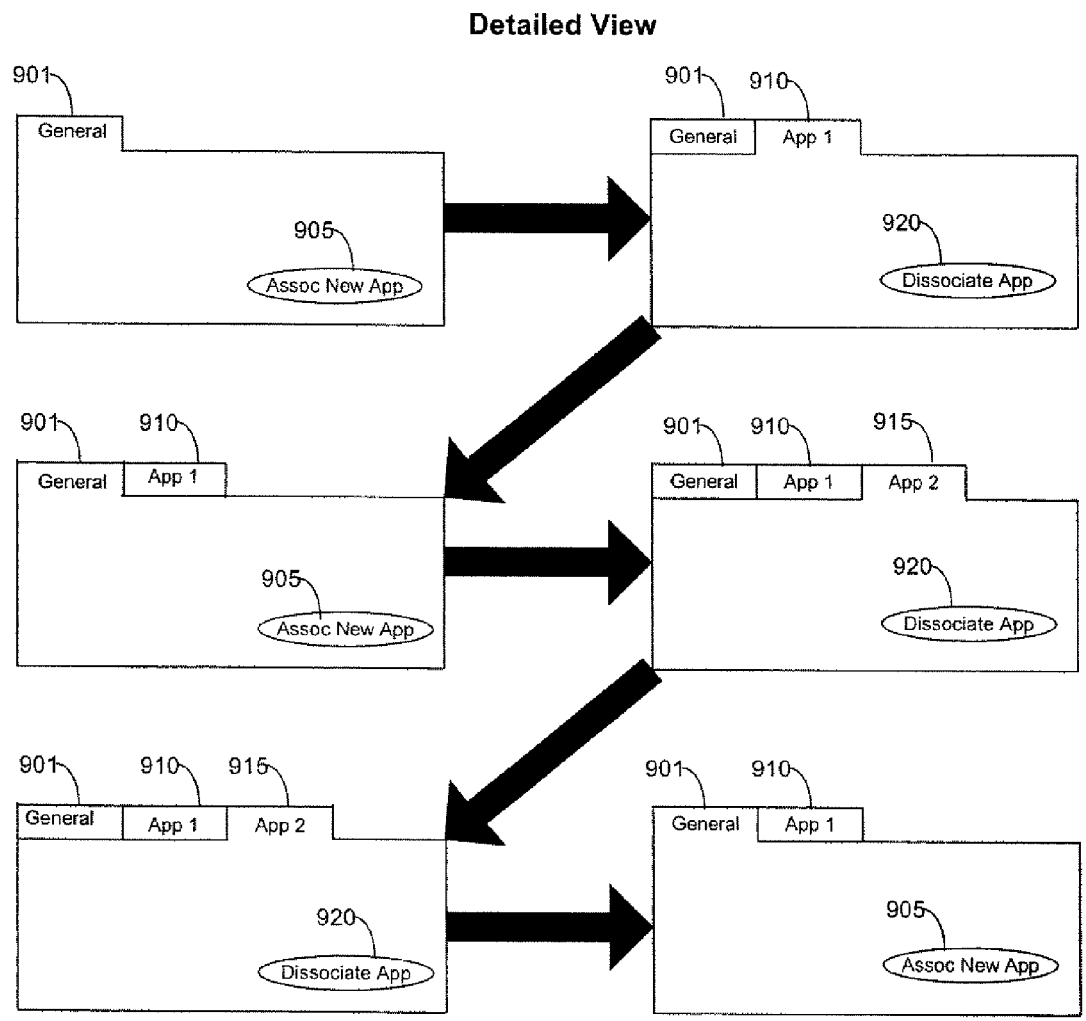
FIG. 9 is an exemplary detailed view user presentation of the extended contact list showing the association and disassociation of computing application with an entry of the extended contact list in accordance with certain aspects of the present invention.

FIG. 9 is an exemplary detail view of an extended contact list entry. This view is helpful in detailing the associating and disassociating of a computing application with an entry in the extended contact list. In the detailed view, each entry is associated with a general page 901 for capturing and showing all individual data fields 107A-N in the general portion 105 of the entry 100 of FIG. 1, i.e., not those that are application-specific. A general page 901 is preferably subdivided into a "public" portion and a "private" portion, or individual fields displayed on the page (not shown in FIG. 9) may have an indicator by each to allow the user 204 to direct that a particular field be public 105A or private 105B.

Each general page 901 includes an "Assoc New App" button 905 to allow the user 204 to associate a computing application with an entry. Upon activating this button 905, a new page is created 910 (labeled App 1). This page supports the capture and showing of just private elements. The user must specify the application to be associated, as this typically will define application-specific supplemental fields. Specification of an application can be achieved in any of a number of ways, as will be understood by one of ordinary skill in the art. An application could be selected from a closed list presented by the contact service 202, or the user 204 could be required to enter an application identifier. If the user 204 must enter an application identifier, application-specific fields will have to be entered as custom fields by the user 204).

If the user 204 wishes to associate a second computing application with the same entry, he may do so by once again activating the "Assoc New App" button 905 on the General page 901. As shown, a second application-specific page 915 (labeled App 2) is created upon a second activation of button 905.

A "Dissociate App" button 920 is provided on each application-specific page. If the user 204 wishes to dissociate a computing application from an entry, he can select the "Dissociate App" button 920 on the appropriate application page. Upon selection of a "Dissociate App" button 920, and preferably after application-specific validation and user confirmation, that page is removed (and any associated icon or URL is removed from the summary view). FIG. 9 shows App 2 being dissociated from an entry.

In order to focus on the invention at hand, it is assumed that the user 204 has already enrolled with the EBPSP 203 and can be authenticated by the EBPSP 203 given the presentation of proper credentials, such as .NET Passport information. Two processing alternatives exist for computing application invocation from the extended contact list. One is a "push" scenario (in which information stored in the extended contact list of the present invention is pushed to the application), and the other is a "pull" scenario (in which an associated application retrieves contact information from the expanded contact list. Both the push and the pull scenario are available whether the extended contact list is hosted by the contact service 202, the user computing system 500, or elsewhere.

Figure 10:
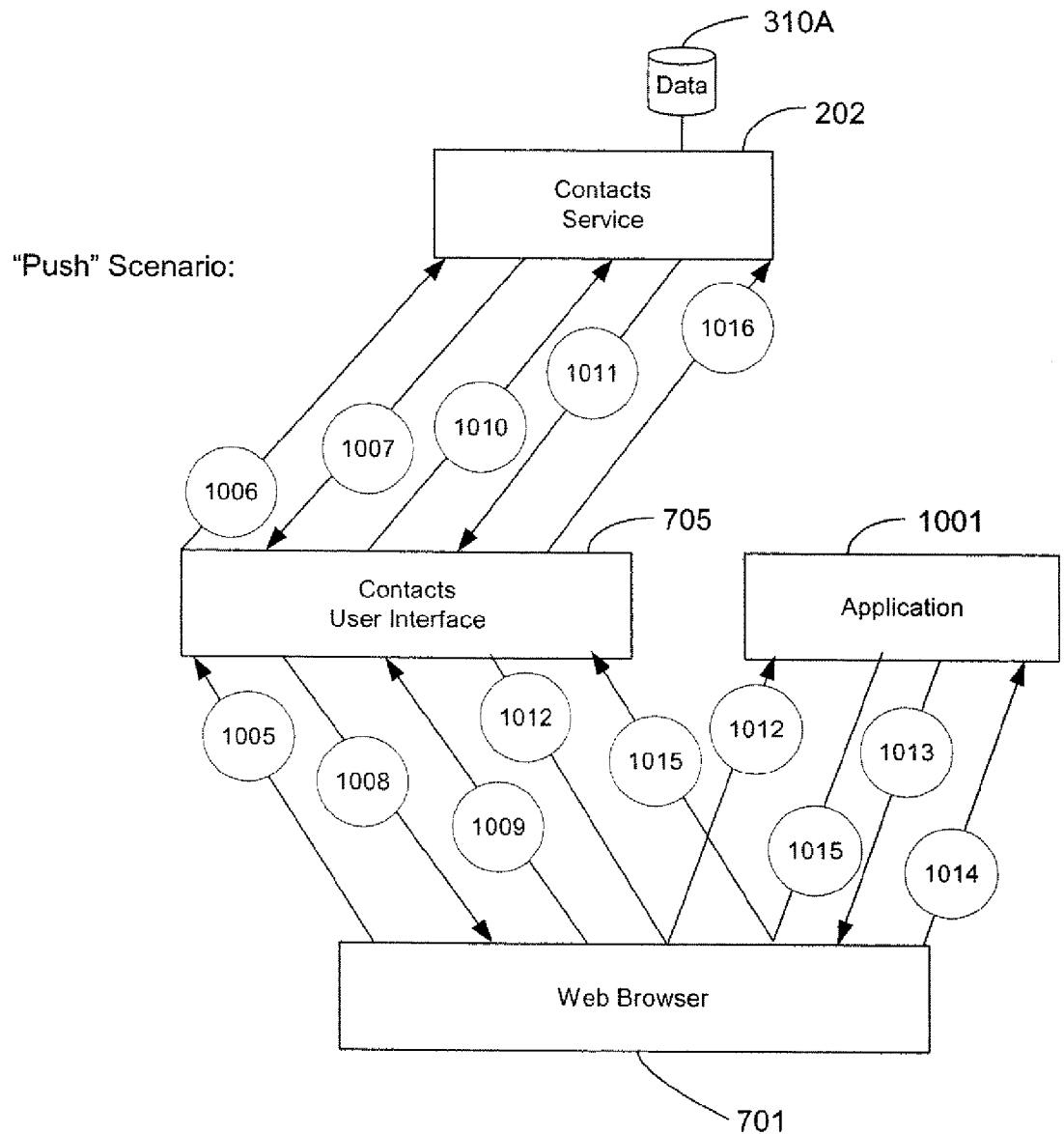
FIG. 10 is a simplified exemplary depiction of extended contact list information being pushed to a computing application by a contact service in accordance with certain aspects of the present invention.

FIG. 10 is a simplified depiction of the "push" scenario in accessing application functionality offered by the EBPSP 203 when the extended contacts list is hosted by the contact service 202. At detail 1005, the user 204, via Web browser 701, requests to view the summary view of contact information. This request is transmitted by the communications interface 515 of the user system 500 to a communication interface 315 of the contact service 202 via the network 206. It will be appreciated that all communications between the user 204, the contact service 202, and the EBPSP 203, shown in FIG. 10 as computing application 1001, are via the network 206. After receipt of the request, the contact user interface 705 requests appropriate information, i.e. contact information for display in the summary view, from the contact service 202, detail 1006. The requested information for presentation to user 204 is information stored in the extended contact list database 310A.

At detail 1007 the contact service 202 passes the requested information to the contact user interface 705. The contact user interface 705 in turn passes the retrieved information to the user's Web browser 701, where it is then presented as a summary view, including application icons, detail 1008. The user 204 selects a function to invoke in association with a particular entity, via an I/O device 522. In the present example, the user 204 selects an EBP unction offered by the EBPSP 203. The user selection is then transmitted back to the contacts user interface 705, detail 1009.

At detail 1010, after receiving the user selection, the contact user interface 705 requests all relevant stored information associated with the EBP application from the contacts service 202, including a network address associated with the EBPSP 203. This may include, for any given associated application, a combination of general and public/hidden application-specific information. The contact service 202 passes the requested information to the contact user interface 705, detail 1011. The contact user interface 705, utilizing the retrieval network address, redirects the user browser 701 to the application 1001, detail 1012. The retrieved contact information is bundled as a set of accompanying tagged parameters in a query string or as part of a "post" command or some equivalent Web mechanism in the redirection. Preferably, though not required, information identifying the user 204 is included in the bundle.

At detail 1013 the application 1001 transmits an appropriate function page with fields populated from the passed parameters to the user 204, requesting confirmation from the user. The function page is then presented to the user. The user 204 confirms the function, detail 1014, via an I/O device 522. Thereafter, the application 1001 performs the requested function.

After performing the requested function, the application 1001 may beneficially redirect the user browser 701 to the contact user interface 705, appending a set of return tagged parameters to add/update "hidden" values, detail 1015. The contacts user interface passes this information to the contacts service 202, detail 1016. The contacts service 202 then adds/updates "hidden" values, utilizing passed information. This is the scrubbing of data.

Figure 11:
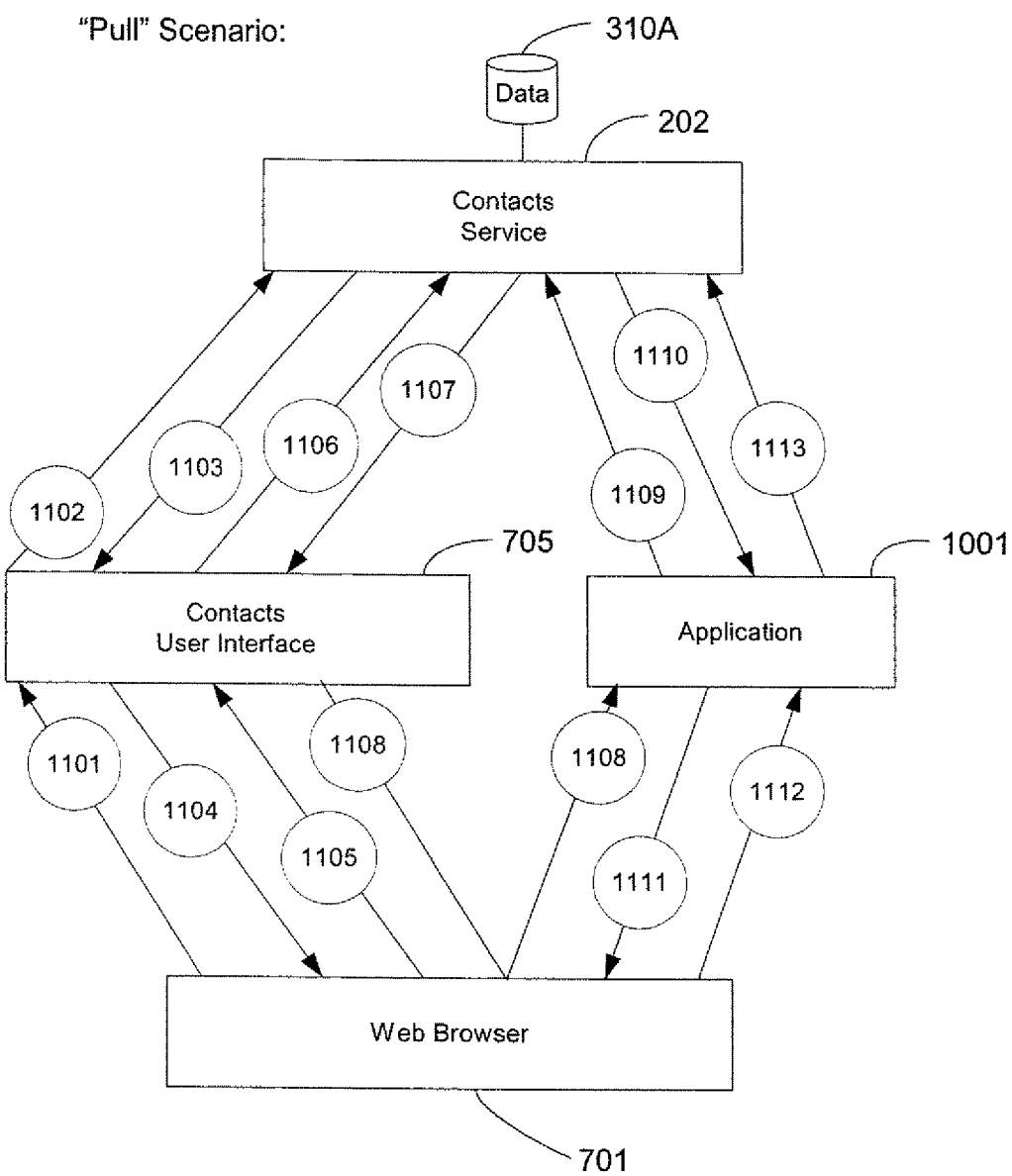
FIG. 11 is a simplified exemplary depiction of extended contact list information being pulled by a computing application from a contact service in accordance with certain aspects of the present invention.

FIG. 11 is a simplified depiction of the "pull" scenario when the extended contact list is hosted by the contact service 202. At detail 1101 the user 204, via Web browser 701, requests to view a summary view of contact information, as above in FIG. 10. The contact user interface 705 requests appropriate stored information from the contact service 202, detail 1102, and the contact service 202 passes the requested information to the contact user interface 705, detail 1103, also as above.

At detail 1104, the contact user interface 705 transmits the summary view, including application icons, to the user 204. This information is presented to the user 204. The user 204 selects a function to invoke in association with a particular entity, detail 1105, as above. Different than the push scenario, the contact user interface 705 requests only an entity identifier from the contact service 202 if not already in a memory, detail 11106. That is, if user 206 has previously requested to invoke a function associated with that entity, the entity identifier may be, as desired, retained by the contacts user interface 705.

The contact service 202 passes the requested information to the contact user interface 705, detail 1107. The contact user interface 705 redirects the user browser 701 to the requested application 1001 bundling only a minimal set of information (entry identifler+crypto-token to delegate authority to access information at contact service 202) as a set of accompanying tagged parameters in a query string or as part of a "post" command or some equivalent Web mechanism, detail 1108. As above, preferably information identifying the user 204 is included in the bundle.

At detail 1109, the application 1001 requests the full set of relevant information, via network 206, from the contact service 202, using the crypto-token delegation access authorization from the user 204 and the entity identifier. The contact service 202 passes the requested information to the application 1001, detail 1110, via network 206.

The application 1001 transmits an appropriate function page with fields populated from the information received from the contact service 202 to the user 204, requesting confirmation from the user 204, detail 1111. This function page is presented to the user 204 by Web browser 701. At detail 1112 the user 204 confirms the function, via an I/O device 522. As necessary, the application 1001 adds/updates "hidden" values in the appropriate entry directly via the contact service 202, detail 1113.

It should be noted that, in both the push and the pull scenarios, the user selection of a function to invoke might not require retrieval of information from the contact service 202 by the contact user interface 705 prior to redirection if the icon or link has already been previously associated with the correct bundle of information. In that case, the user browser 701 would be directed immediately to the application upon selection of the icon or link. That is, the bundle of information could be stored for easy access by the contacts user interface 705.

Also, though not shown, although the general 105 and application-specific 106 portions of the contact information may appear to be unified, they could be, as desired maintained in separate data repositories by separate applications. Thus, the general information may be maintained by the contact service 202, but the application-specific portions could be maintained in a more local repository maintained by another entity.

As will be recognized from the discussion above, the present invention provides data-centric application invocation. That is, via the extended contact list the user 204 first selects data and then a function to be performed utilizing that data, whether a push or a pull scenario is utilized. In the present example of data-centric application invocation, the extended contact list is maintained by the contact service 202, and user 204 invokes an EBP application offered by the EBPSP 203. The EBP application could include one or more types of functionality, including, but not limited to, electronic payments, electronic bill presentment, electronic bill issuance, often called invoicing, and financial transaction history viewing. Alternatively, the extended contact list can be stored on the user's computing system 500, and user 204 invokes application functionality of any kind either offered by a service provider, or performed by the user's computing system 500.

The information associated with the EBP application 1001 passed to the EBP application 1001 includes at least information identifying and associated with the entity whose contact information the user 204 is viewing when an application icon is activated, and preferably information identifying the user 204. The passed information associated with the entity could be any of, or all of, the entity's name, address, e-mail identifier, the user's account number with the entity, an entity phone number, and/or other application-specific data fields. It should be noted that information indicating a location of the entity, whether on a network or a physical location, does not have to be passed. If the requested transaction is a payment to the entity, the passed information preferably includes information identifying a payment account associated with the user 204. Payment account information could be stored in the extended contacts list, or elsewhere.

If the user 204 has not set up the entity with the EBPSP 203, the user must activate the entity for the requested transaction. That is, the user must activate the entity as a payee, a biller, and/or a bill recipient. The EBPSP 203 transmits an activation user presentation to the user 204. The activation user interface is preferably pre-populated with at least a portion of the passed information.

If the passed information is insufficient for the EBPSP 203 to fulfill the requested transaction, which may be because the entity is not yet activated, in one alternative the EBPSP 203 presents a screen to the user 204 for the user 204 to supply the missing information. Alternatively, the EBPSP 203 could obtain the information without requesting it from the user 204. U.S. patent application Ser. No. 09/892,897, filed Jun. 28, 2001 and entitled "Inter-Network Financial Services" and assigned to the Assignee of the present application, is incorporated herein in its entirety and discloses techniques for obtaining missing information. Also, U.S. patent application Ser. No. 10/285,707, filed Nov. 1, 2002 and entitled "Easy User Activation Of Electronic Commerce Services" and assigned to the Assignee of the present application, is incorporated herein in its entirety and discloses other techniques for obtaining missing information.

After the EBPSP 203 obtains all necessary information, whether all from the contact service 202, from one or more other sources, or from both the contact service 202 and one or more other sources, the EBPSP 203 fulfills the requested transaction. Another source could include the user 204. For a requested payment, the payment could be a paper payment, such as a draft, check, or other paper instrument, or could be an electronic payment such as an ACH-based electronic funds transfer. For a requested bill issuance, the bill could be issued electronically, perhaps utilizing a passed e-mail identifier, or could be a paper bill, perhaps utilizing passed physical address information.

For a requested electronic bill presentment of a bill issued by the entity to the user 204, the electronic bill presentation could be presentation of only bill summary data, with links to another site for bill detail, or bill detail directly. The EBPSP 203 could beneficially, as desired, utilize techniques disclosed in U.S. patent application Ser. No. 10/285,707, introduced above, in electronically presenting bills to the user 204. Also, techniques disclosed in U.S. Pat. No. 6,289,322, assigned to the Assignee of the present application and incorporated herein in its entirety, and U.S. Pat. No. 6,055,567, also assigned to the Assignee of the present application and incorporated herein in its entirety, may beneficially be utilized in electronic presentation of a bill.

For a requested electronic presentation of past financial transactions, facilitated by the EBPSP 203, between the entity and the user 204, the EBPSP 203 could also beneficially utilize techniques disclosed in U.S. patent application Ser. No. 10/285,707. Preferably, the presentation of historical data may be sorted, as desired by the user 204, by transaction date, status, or other attributes.

The present invention is not to be limited in scope by the specific embodiments described herein. Indeed, various modifications of the present invention in addition to those described herein will be apparent to those of skill in the art from the foregoing description and accompanying drawings. Thus, such modifications are intended to fall within the scope of the appended claims.

That which is claimed:

1. A method, comprising:

transmitting, by a contact management system comprising one or more computers via a network for presentation to a user, a representation of one or more contacts associated with the user, wherein the one or more contacts comprise a first contact;

receiving, by the contact management system on behalf of the user via the network, a request to associate an application with the first contact, wherein the application is not associated with the first contact prior to receipt of the request; and transmitting, by the contact management system via the network for presentation to the user and responsive to receiving the request, a revised representation of the one or more contacts, wherein the revised representation comprises a user-selectable mechanism for invoking the application in association with the first contact, wherein a content presentation application presenting the revised representation is redirected, responsive to selection of the user-selectable mechanism, from the contact management system to a user interface associated with the application, wherein the user interface is hosted by a second system that is different from the contact management system, and wherein the redirection includes transmission of information associated with the user and information associated with the first contact from the contact management system to the second system.

2. The method of claim 1, wherein at least one of the representation or the revised representation comprises a respective at least one of: (i) a name, (ii) a company, (iii) primary contact information, or (iv) a category, associated with each of the one or more contacts.

3. The method of claim 1, wherein an entity different from the contact management system stores information associated with the one or more contacts.

4. The method of claim 1, wherein the application is selected from a closed list of available applications.

5. The method of claim 1, wherein the application is an electronic billing and payment (EBP) application that supports at least one of: (i) electronic payment functionality, (ii) electronic bill presentment functionality, (iii) electronic bill issuance functionality, or (iv) functionality for presenting financial transaction information.

6. The method of claim 1, wherein the application determines that the information associated with the user and the information associated with the first contact are insufficient to fulfill a transaction associated with one or more types of desired functionality, and wherein the application obtains further information from one of: (i) the user or (ii) another source.

7. The method of claim 6, wherein the application determines that the information associated with the user and the information associated with the first contact are insufficient after determining that the first contact has not yet been activated by the user for the one or more types of desired functionality.

8. The method of claim 1, wherein the user-selectable mechanism comprises one of: (i) an icon, (ii) a link, or (iii) an item included in a displayed set of selectable options.

9. The method of claim 1, wherein the one or more contacts is a plurality of contacts that further comprises a second contact, the application is a first application, and the revised representation comprises a second user-selectable mechanism for invoking a second application in association with the second contact, and
    wherein the content presentation application presenting the revised representation is redirected, responsive to selection of the second user-selectable mechanism, from the contact management system to a user interface associated with the second application.

10. The method of claim 1, wherein the application is a first application, and wherein selection of the user-selectable mechanism associated with the first contact invokes a second application that invokes the first application based at least in part on at least a portion of the information associated with the first contact.

11. The method of claim 1, wherein the user interface associated with the application comprises one or more fields populated with at least one of: i) at least a portion of the information associated with the user or ii) at least a portion of the information associated with the first contact.

12. The method of claim 1, wherein the information associated with the first contact comprises at least one of: (i) a contact identifier, (ii) a contact name, (iii) an address, (iv) an email identifier, (v) an account number, or (vi) a phone number.

13. The method of claim 1, wherein the request is a first request, further comprising:
    receiving, by the contact management system on behalf of the user, a second request to invoke the application based at least in part on selection of the user-selectable mechanism associated with the first contact,
    wherein the content presentation application presenting the revised representation is redirected to the user interface associated with the application responsive to receiving the second request.

14. The method of claim 1, further comprising:
    receiving, by the contact management system and based at least in part on transmission from the application, one or more updated or new values associated with the first contact; and
    directing, by the contact management system, storage of the one or more updated or new values in association with the first contact.

15. The method of claim 14, wherein the one or more updated or new values comprise one or more hidden values that are not presented to the user.

16. The method of claim 14, wherein selection of the user-selectable mechanism is a first selection,
    wherein the redirection is a first redirection,
    wherein a second selection of the user-selectable mechanism facilitates a second redirection of the user application presenting the revised representation to the user interface associated with the application, the second selection occurring subsequent to receiving the one or more updated or new values, and
    wherein the second redirection includes transmission of at least a portion of the one or more updated or new values associated with the first contact.

17. The method of claim 1, wherein the application obtains further information associated with the first contact from an entity storing information associated with the one or more contacts based at least in part on at least one of: i) at least a portion of the information associated with the user or ii) at least a portion of the information associated with the first contact.

18. The method of claim 1, wherein the content presentation application comprises a Web browser.

19. A system, comprising:
    one or more communications interfaces operable to:
        (i) to transmit, via a network for presentation to a user, a representation of one or more contacts associated with the user, wherein the one or more contacts comprise a first contact,
        (ii) to receive, on behalf of the user via the network, a request to associate an application with the first contact, wherein the application is not associated with the first contact prior to receipt of the request, and
        (iii) to transmit, via the network for presentation to the user and responsive to the received request, a revised representation comprising a user-selectable mechanism for invoking the application in association with the first contact,
        wherein a content presentation application presenting the revised representation is redirected, responsive to selection of the user-selectable mechanism, to a user interface associated with the application, wherein the user interface is hosted by a second system that is different from the system, and wherein the redirection includes transmission of information associated with the user and information associated with the first contact to the second system; and
    one or more processors operable to:
        (i) direct the communications interface to transmit the representation of the one or more contacts, and
        (ii) direct the communications interface to transmit the revised representation responsive to the received request.

20. The system of claim 19, wherein at least one of the representation or the revised representation comprises a respective at least one of: (i) a name, (ii) a company, (iii) primary contact information, or (iv) a category, associated with each of the one or more contacts.

21. The system of claim 19, further comprising:
    at least one memory operable to store information associated with the one or more contacts and information associated with one or more applications associated with the one or more contacts.

22. The system of claim 21, wherein the one or more communications interfaces and the one or more processors are associated with a first entity and the at least one memory is associated with a second entity.

23. The system of claim 19, wherein the application is selected from a closed list of available applications.

24. The system of claim 19, wherein the application is an electronic billing and payment (EBP) application that supports at least one of: (i) electronic payment functionality, (ii) electronic bill presentment functionality, (iii) electronic bill issuance functionality, and (iv) functionality for presenting financial transaction information.

25. The system of claim 19, wherein the application determines that the information associated with the user and the information associated with the first contact are insufficient to fulfill a transaction associated with one or more types of desired functionality, and wherein the application obtains further information from one of: (i) the user or (ii) another source.

26. The system of claim 25, wherein the application determines that the information associated with the user and the information associated with the first contact are insufficient based at least in part on determining that the first contact has not yet been activated by the user for the one of the one or more types of desired functionality.

27. The system of claim 19, wherein the user-selectable mechanism comprises one of: (i) an icon, (ii) a link, or (iii) an item included in a displayed set of selectable options.

28. The system of claim 19, wherein the one or more contacts is a plurality of contacts that further comprises a second contact, the application is a first application, and the revised representation comprises a second user-selectable mechanism for invoking a second application in association with the second contact, and
wherein the content presentation application presenting the revised representation is redirected, responsive to selection of the second user-selectable mechanism, to a user interface associated with the second application.

29. The system of claim 19, wherein the application is a first application, and
wherein selection of the user-selectable mechanism associated with the first contact invokes a second application that invokes the first application based at least in part on at least a portion of the information associated with the first contact.

30. The system of claim 19, wherein the user interface associated with the application comprises one or more fields populated with at least one of: i) at least a portion of the information associated with the user or ii) at least a portion of the information associated with the first contact.

31. The system of claim 19, wherein the information associated with the first contact comprises at least one of: (i) a contact identifier, (ii) a contact name, (iii) an address, (iv) an email identifier, (v) an account number, or (vi) a phone number.

32. The system of claim 19, wherein:
the request is a first request,
the one or more communications interfaces are further operable to receive, on behalf of the user, a second request to invoke the application based at least in part on selection of the user-selectable mechanism associated with the first contact, and
wherein the one or more processors are further operable to redirect the content presentation application presenting the revised representation to the user interface associated with the application responsive to receipt of the second request.

33. The system of claim 19, wherein:
the one or more communications interfaces are further operable to receive, based at least in part on transmission from the application, one or more updated or new values associated with the first contact, and
the one or more processors are further operable to direct storage of the one or more updated or new values in at least one memory in association with the first contact.

34. The system of claim 33, wherein the one or more updated or new values comprise one or more hidden values that are not presented to the user.

35. The system of claim 33, wherein:
the selection of the user-selectable mechanism is a first selection,
the redirection is a first redirection,
a second selection of the user-selectable mechanism facilitates a second redirection of the user application presenting the revised representation to the user interface associated with the application, the second selection occurring subsequent to receipt of the one or more updated or new values, and
the second redirection includes transmission of at least a portion of the one or more updated or new values associated with the first contact.

36. The system of claim 19, wherein the application obtains further information associated with the first contact from an entity storing information associated with the one or more contacts based at least in part on at least one of: i) at least a portion of the information associated with the user or ii) at least a portion of the information associated with the first contact.

37. The system of claim 19, wherein the content presentation application comprises a Web browser.

38. A system, comprising:
means for transmitting, via a network for presentation to a user, a representation of one or more contacts associated with the user, wherein the one or more contacts comprise a first contact;
means for receiving, on behalf of the user via the network, a request to associate an application with the first contact, wherein the application is not associated with the first contact prior to receipt of the request; and
means for transmitting, via the network for presentation to the user and responsive to receipt of the request, a revised representation of the one or more contacts, wherein the revised representation comprises a user-selectable mechanism for invoking the application in association with the first contact,
wherein a content presentation application presenting the revised representation is redirected, responsive to selection of the user-selectable mechanism, to a user interface associated with the application, wherein the user interface is hosted by an external system, and wherein the redirection includes transmission of information associated with the user and information associated with the first contact to the external system.

* * * * *